(12) United States Patent
Tran

(10) Patent No.: US 8,411,293 B2
(45) Date of Patent: Apr. 2, 2013

(54) METHOD AND PROGRAM FOR CUSTOM SPOOL PAGE PRINTING

(75) Inventor: John Phuong Tran, Garden Grove, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 298 days.

(21) Appl. No.: 12/826,893

(22) Filed: Jun. 30, 2010

(65) Prior Publication Data

US 2012/0002229 A1 Jan. 5, 2012

(51) Int. Cl.
*G06F 15/00* (2006.01)
*G06F 7/04* (2006.01)
(52) U.S. Cl. .......................................... 358/1.13; 726/16
(58) Field of Classification Search ............ 358/1.13
See application file for complete search history.

(56) References Cited

U.S. PATENT DOCUMENTS

2007/0024885 A1* 2/2007 Kim .............................. 358/1.13
2008/0158581 A1* 7/2008 Ferlitsch ...................... 358/1.13

* cited by examiner

*Primary Examiner* — Saeid Ebrahimi Dehkordy
(74) *Attorney, Agent, or Firm* — Chen Yoshimura LLP

(57) ABSTRACT

A method and a printer for post-submission and post-rendering custom spooled page printing of a raw print file sent directly to the printer without a printer driver or print application. Embodiments of the method and printer implement a process that includes the steps of sending a raw print file directly to a printer and the printer receiving the raw print file for direct printing, rendering the raw print file by the printer's interpreter, after all pages of the raw print file are spooled, pausing the printer's print engine, providing page printing options on the printer's control panel to allow a user to select pages to be printed, and after receiving the user's page selection, starting the print engine to print only the pages selected by the user.

20 Claims, 8 Drawing Sheets

METHOD AND PROGRAM FOR CUSTOM SPOOL PAGE PRINTING

BACKGROUND OF THE INVENTION

1. Field of the Invention

This invention relates generally to methods and programs for managing print jobs, and in particular, it relates to methods and programs for post-submission custom spooled page printing.

2. Description of Related Art

When a user send a print job of a multi-pages document from a user terminal to a printer, often times the user desires not to print all pages, but only a subset of the pages, of the document. Sometimes the document is printed via a printer driver. Many application menus provide the user with an option of printing, for example, all pages or only certain pages of the documents. For example, FIG. 1 shows a representative screen-shot of a typical software application print menu that provides the options of printing "all" pages or only the "current page", or specified pages. When a user clicks on the "Property" button, a graphic user interface (GUI) given by a printer driver will appear that provide the user with print options. The user can select the desired option and print the document accordingly.

Other times the document is printed via a print application. Many applications also provide the user with various printing output methods. For example, FIG. 2 shows a representative screen-shot of a GUI of a printer front panel menu provided by a printer driver that provides the options of various output modes, such as a "print" mode, a "secure print" mode, a "save in user box" mode, a "wait" mode, etc. In one or more of these modes (e.g., the "secure print" mode), a print job is stored on the printer for later retrieval by the user and is not immediately printed by the printer, which provide an option to the user to print all pages or only selected pages. As illustrated in another representative screen-shot of the PageScope™ Web Connection application shown in FIG. 3, for a stored print job later retrieved for printing, the application will select "All Pages" as default for the "Output Page" option, but also provide the user a choice to change that default option. A user may accept printing all pages by press or click the "OK" button, or choose to print selected pages by press or click the "Change Output Page" button.

However, in many instances a user may send raw print files, such as a PDF (Portable Document Format) file, an XPS (XML Paper Specification) file, a TIFF (Tagged Image File Format) file, and any other document files that a printer can interpret, directly to the printer, bypassing a printer driver or an application, for direct printing without converting the row print files into a print job written in a PDL (Page Description Language) in the user terminal. This often leaves the user with no control of what page numbers the user wants to print, as illustrated in the exemplary screen-shot a direct print utility for directly sending a print job to a printer shown in FIG. 4. As the result, the entire page range of the print job is printed, which can be time-consuming and wasteful of toner and paper consumption, especially if the print job contains complex rendering data and large number of pages.

Therefore, it would be preferable to have a method and program for post-submission page control of raw print files that are directly sent to the printer without printer driver or utility application.

SUMMARY

The present invention is directed to a method and program for post-submission custom spooled page printing.

It is an object of the present invention to provide a method and program for post-submission spooled page control printing of raw print files that are directly sent to the printer without printer driver or utility application.

Embodiments of the present invention provide a method and program that allows a user to select page control options for printing a raw print file that is directly sent to the printer without printer driver or utility application, after the raw print file is rendered or rasterized by the printer interpreter and all pages are spooled.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, embodiments of the present invention provide a method and a printer for post-submission and post-rendering custom spooled page printing of a raw print file sent directly to the printer without a printer driver or print application.

Embodiments of the method implement the process that includes the steps of sending a raw print file directly to the printer for direct printing, rendering the raw print file by the printer's interpreter; after all pages of the raw print file are spooled, pausing the printer's print engine, providing page printing options on the printer's control panel to allow a user to select pages to be printed; and after receiving the user's page selection, starting the print engine to print only the pages selected by the user.

Embodiments of the printer include a controller executing a computer program code to control the printer, the code being configured to cause the printer to execute a process for providing custom spooled page printing, where the process includes the steps of receiving a raw print file for direct printing, rendering the raw print file by the printer's interpreter; after all page(s) of the raw print file are spooled, pausing the printer's print engine, providing page printing options on the printer's control panel to allow a user to select pages to be printed; and after receiving the user's page selection, starting the print engine to print only the pages selected by the user.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method for post-submission, post-rendering customer spooled page printing. The present invention method may be implemented by a printer-based computer software program that has program codes and instructions for implementing the steps of the present invention.

Figure 1:
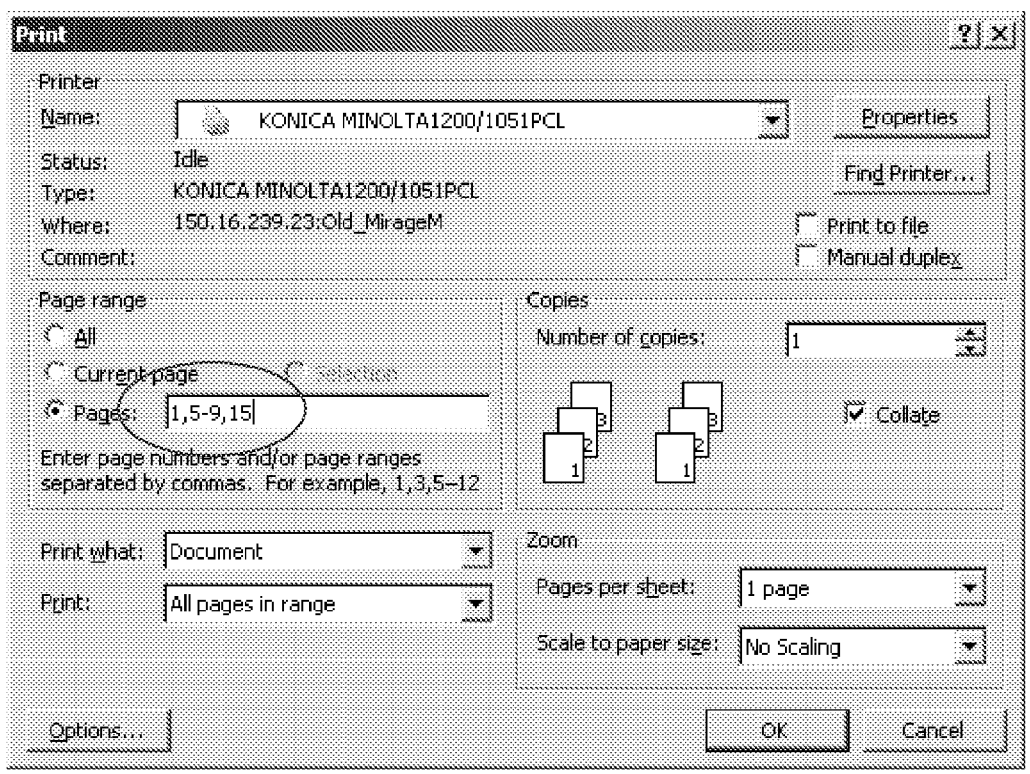
FIG. 1 illustrates an exemplary screen-shot of a printer driver which provides certain print page control options to the user.
Figure 2:
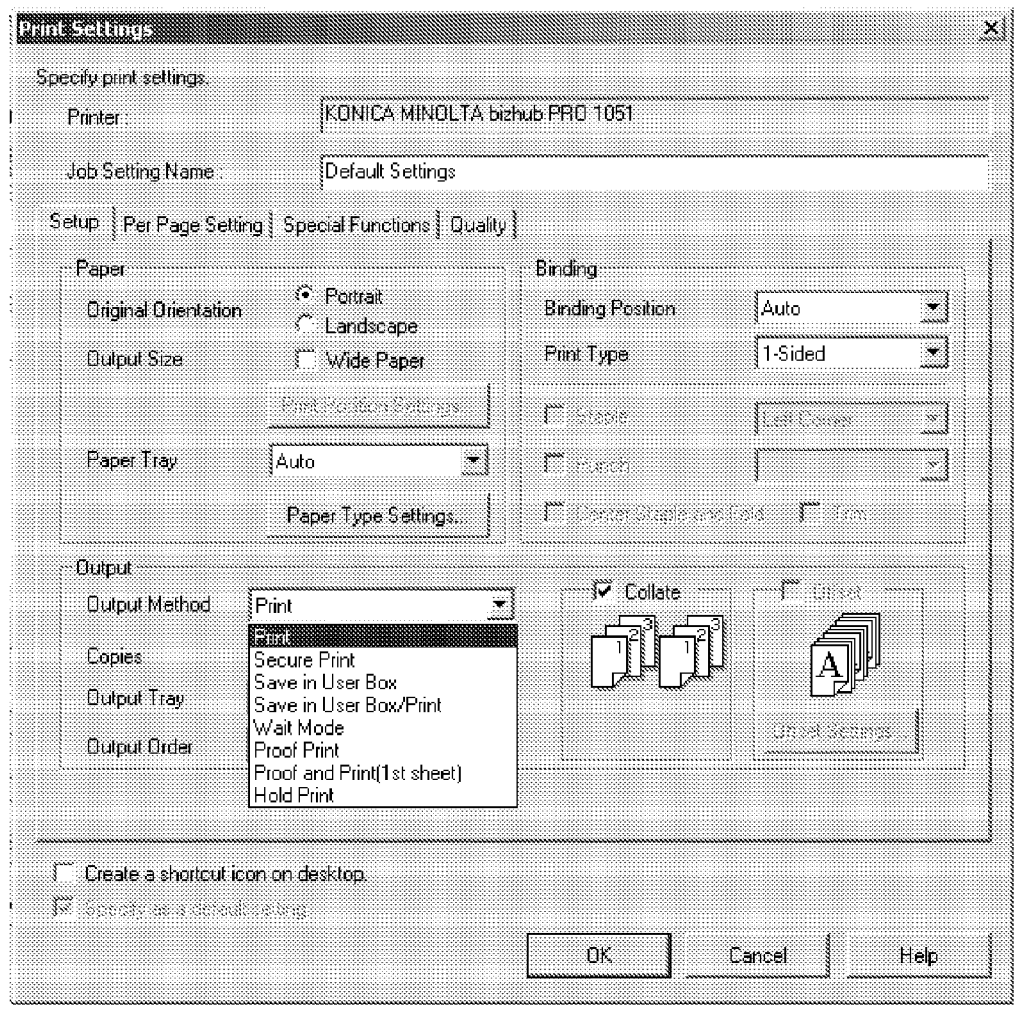
FIG. 2 illustrates an exemplary screen-shot of a print application which provides certain print mode(s) to the user, some of them can store a print job for later retrieval and printing, upon which certain page control options may be available to the user.
Figure 3:
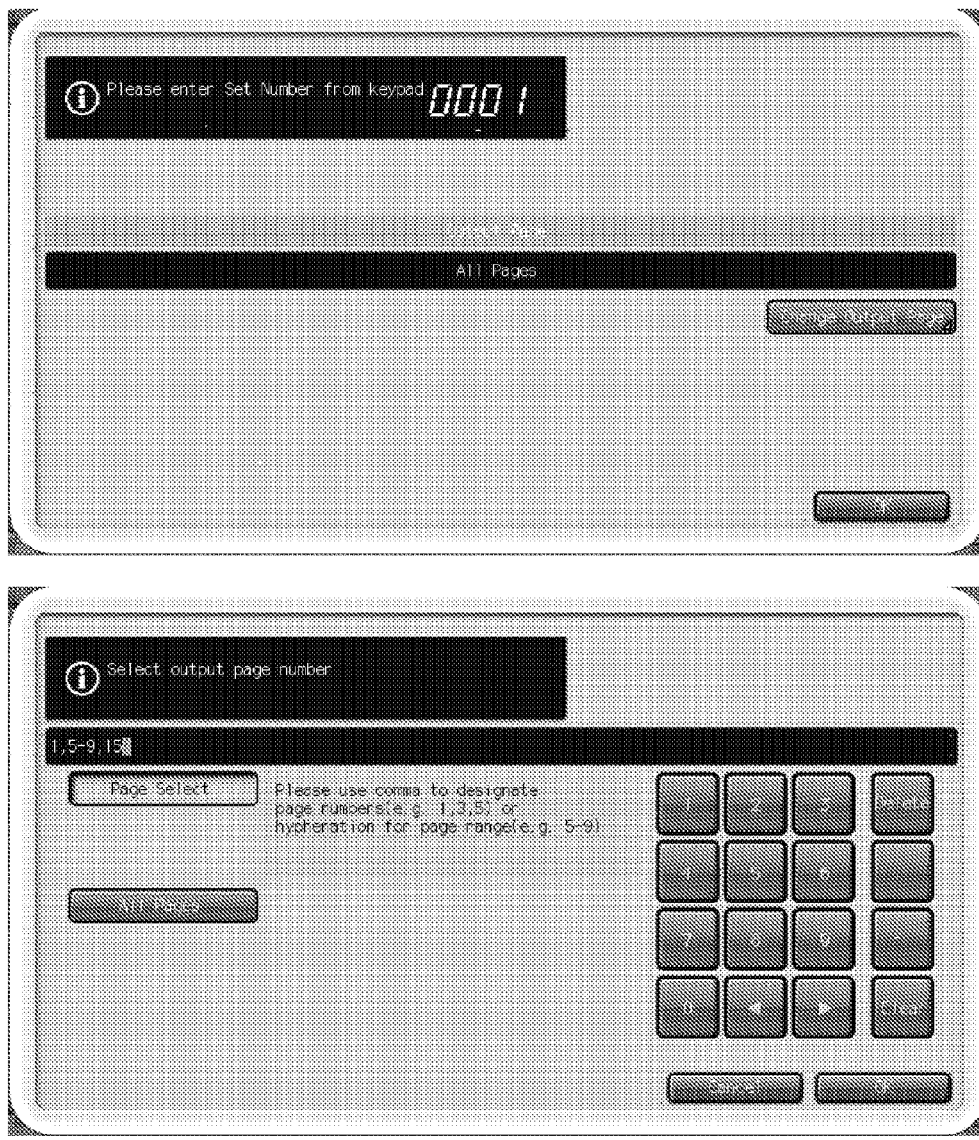
FIG. 3 illustrates an exemplary screen-shot of the print application that allows a print job to be stored for later retrieval and printing, showing certain page control options.
Figure 4:
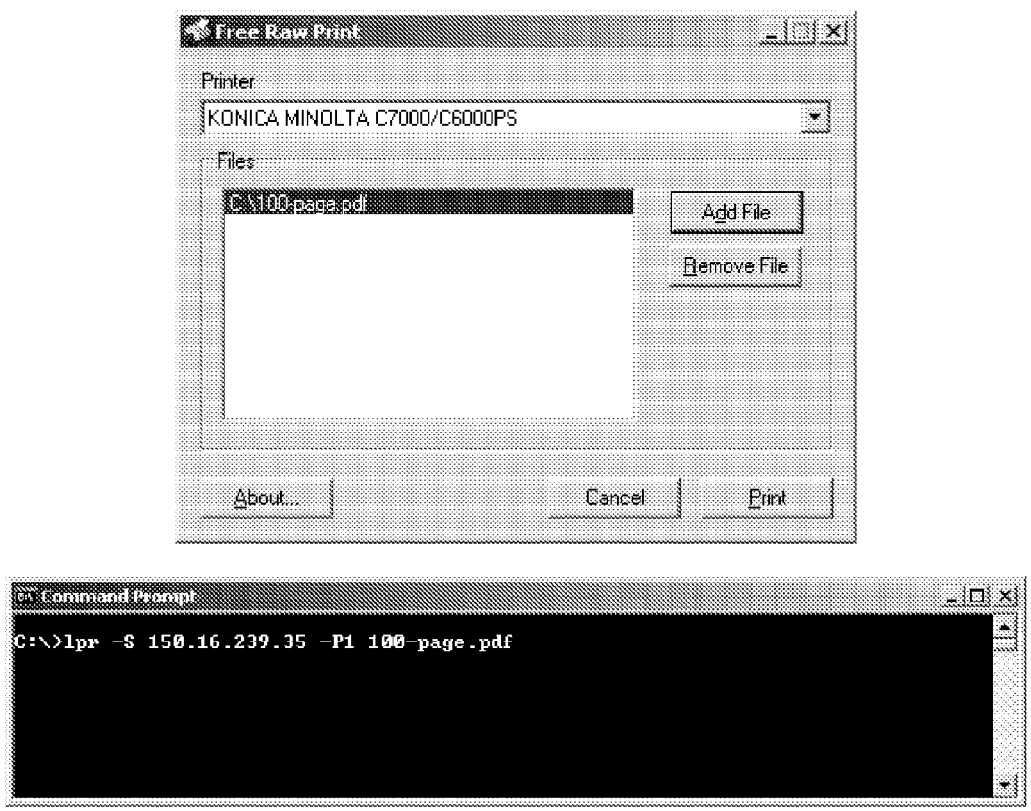
FIG. 4 illustrates an exemplary screen-shot of the direct print utility for sending a raw print file to a printer which provides no print page control options after the raw print filed is submitted to the printer.
Figure 5:
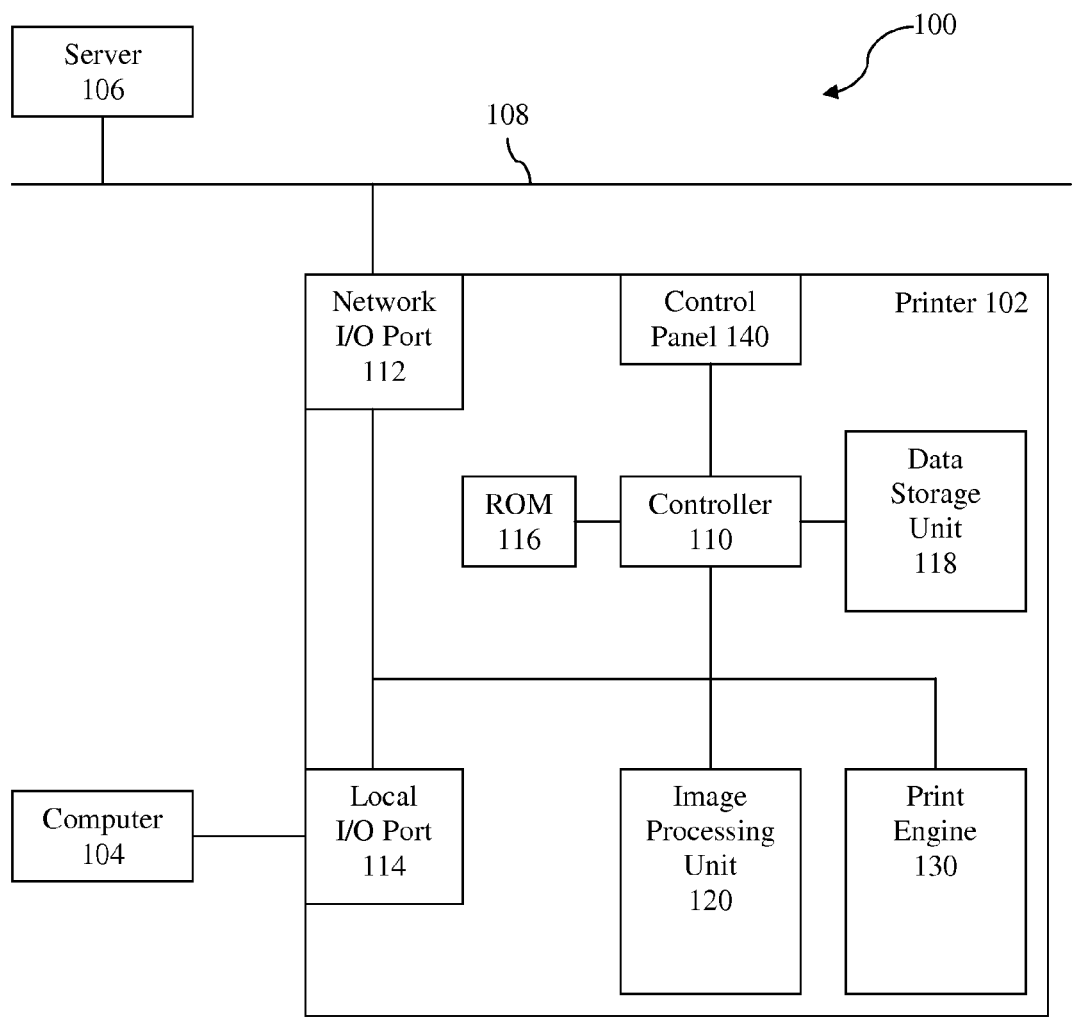
FIG. 5 illustrates a set up or arrangement of a printing according to an embodiment of the present invention.

Referring to FIG. 5, there is shown at 100 a schematic block diagram of an exemplary printer or printing system set up or arrangement in which embodiments of the present invention may be implemented. The term "printer" or "printing system" used herein may cover small desk-top printers typically seen in an office environment, or large printing systems used in print/copy departments at large organizations or professional print shops. It may also cover other similar image and document processing devices such as copiers or multifunction ("all-in-one") machines that have printer, copier, scanner and/or facsimile functions. The "printer" or "printing system" may be directly attached to one or more computers and/or servers locally, or connected to one or more computers and/or servers through a network either directly or remotely, where the computers and/or servers are used to generate and send a print job to be processed by the printer or printing system through a printer driver or print application which is a computer software program normally stored on a non-transitory memory medium of the computer and/or servers for converting the document or image to be printed to the form specific to the printer or printing system.

As shown in the printing system set up or arrangement 100, a printer 102 may be directly attached to a local computer 104, or remotely connected to a server 106 through a data communication channel 108 which may be a wired or wireless network, a dedicated cable or a serial bus connected to the printer 102. Printer 102 includes a controller or control unit 110, an image processing unit 120 and a print engine 130. Printer 102 also has a local input/output (I/O) port 112 for connection with local computer 104, and a network I/O port 114 for connection with remote server 106. The control unit 110 controls the other internal units of printer 102 and is connected to a control panel 140, a read-only memory (ROM) 116 and a data storage unit 118. The software program exemplarily implementing the present invention method and process is installed on ROM 116 or data storage unit 118, which include a non-transitory memory medium, and can be accessed and executed by the control unit 110. The control panel 140 is accessible by a user. The control panel 140 provides a user interface (UI) that includes a display screen such as a liquid crystal display (LCD) display screen and user input devices such as keys, buttons, touch screen, etc., for a user to communicate with the printer 102 and control the functions and operations of printer 102.

One of the common problems addressed in the present invention arise from the following exemplary situation. A user wants to print a raw print file, such as a portable document format (PDF) file, directly by the printer. The user sends the raw print file from a user terminal to the printer directly without using any printer driver or print application. The raw print file is sent to the printer directly either via an "LPR" print command (i.e., a Unix-based command) on a command prompt line, or via a direct print utility (e.g., the Free Raw Print utility). After submission, the raw print file is rendered (rasterized) by the PDL interpreter, and the print engine proceeds to print the entire job. The raw print file may be a very large file containing hundreds of pages, and the user may realize that not all pages needs to be printed. However, neither the conventional LPR command nor existing direct print utilities provides the user a post-submission printer-based option of spooled page print control. The term "printer-based option" used herein refers to print operation control options provided at the printer, preferably through the UI at the control panel of the printer. Later when referring to computer software programs, the term "printer-based program" shall mean that the software program exemplarily implementing the present invention method and process is installed on and executed from a printer.

Therefore, one embodiment of the present invention presents a method and program for a solution of the problems described above, providing a printed-based program to allow a user to control custom spooled page printing after submission of a raw print job to a printer.

Figure 6:
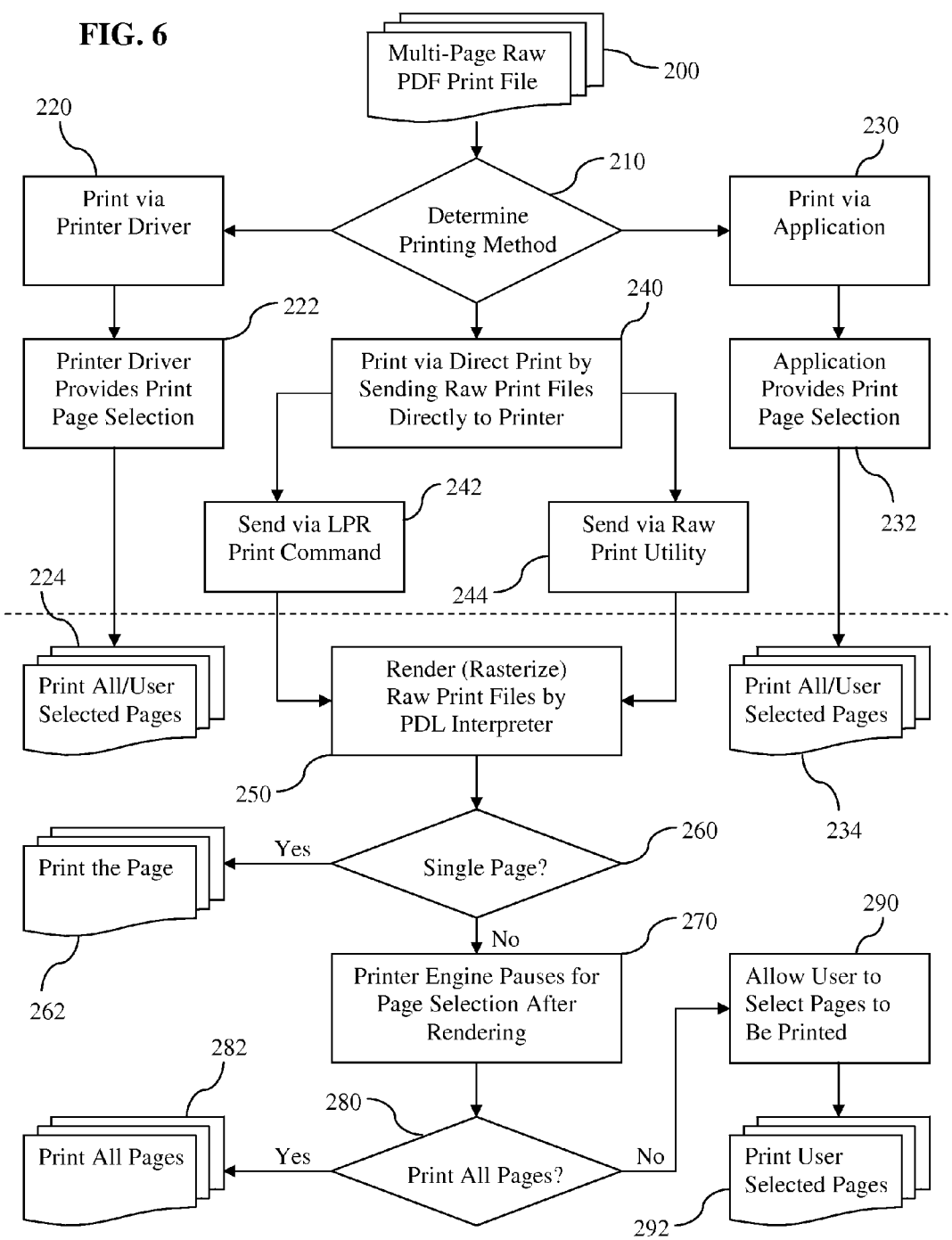
FIG. 6 illustrates a process implemented by a post-submission, post-rendering custom spooled page printing method and program according to one of the embodiments of the present invention.

Referring to FIG. 6, a process implemented by a custom spooled page printing method and programs according to an embodiment of the present invention is illustrated. As described in more detail below, certain steps of the process are to be executed by a user on a computer or user terminal of a server connected to the printer either directly or via network or by the computer or server, and certain other steps of the process are to be executed by the user at the printer via using the printer's control panel or by the printer. The dotted line in the middle of FIG. 6 indicating how the steps are generally divided, where the steps above the dotted line are typically executed or carried out by the user at the user terminal of the server or computer or by the server or computer, and the steps below the dotted line are typically executed or carried out by the user at the printer's control panel or by the printer.

As shown in FIG. 6, when a print job is a multi-page raw PDF print file 200, the first step (step 210) is to decide whether to print the file via a printer driver (step 220), via an application (step 230) or via direct print by the printer (step 240). If the file is to be printed via a printer driver, the printer driver will provide to the user page control options, such as to print all pages, a single page, a subset of multiple pages, or other specified combination of ranges of pages, etc. (step 222). The printer will then print all or some pages of the document based on the user's selection (step 224). If the file is to be printed via a print application, the application may in certain print modes (e.g., the secure print mode) store the print file, and then provide to the user page control options when the user later retrieves the file for printing (step 232). The printer will then print all or some pages of the document based on the user's selection (step 234).

Moreover, the embodiment of the present invention method and program illustrated in FIG. 6 provides a printer-based custom spooled page printing solution when the raw print file is to be printed via direct print, i.e., to be sent directly to, and printed directly by, the printer without a printer driver or a print application (step 240). The raw print file may be directly sent to the printer, for example, via an LPR print command (step 242), or via a raw print utility (step 244), or other suitable ways where the raw print file is sent directly to the printer without a printer driver or a print application. When the printer receives the raw print file directly sent to the printer, the printer will render the raw print file by its interpreter where the entire raw print file is rasterized (step 250). The printer typically has a printer language interpreter such as a PostScript (PS) interpreter and/or a Printer Control Language (PCL) interpreter. In the case of direct printing of Portable Document Format (PDF) files, the commands in the PDF files are translated into PS commands, and then the PS interpreter interprets the PS commands to develop them into raster images.

After rendering/rasterizing, if it is determined that the file contains only a single page (step 260), then the printer engine will print the page immediately (step 262). Otherwise the printer engine will pause to provide the user a post-submission opportunity to make printer-based control of spooled page printing (step 270). The pause of the printer engine may be achieved by simulating an alert status that causes the printer engine to pause (similar to other alerts that pauses the printer engine, such as printer door open, no paper in tray, paper size mismatched, etc.).

When the printer engine is paused, an UI will be provided printer-based options at the printer control panel for selection of various page printing options, such as whether all or some pages shall be printed (step 280). If the user wants to have all spooled pages printed, then the printer engine will proceed to print all spooled pages (step 282). Otherwise the UI will provide options to the user to specify the particular page(s) to be printed (step 290), and the printer engine will then proceed to print only the pages specified by the user (step 292).

Figure 7:
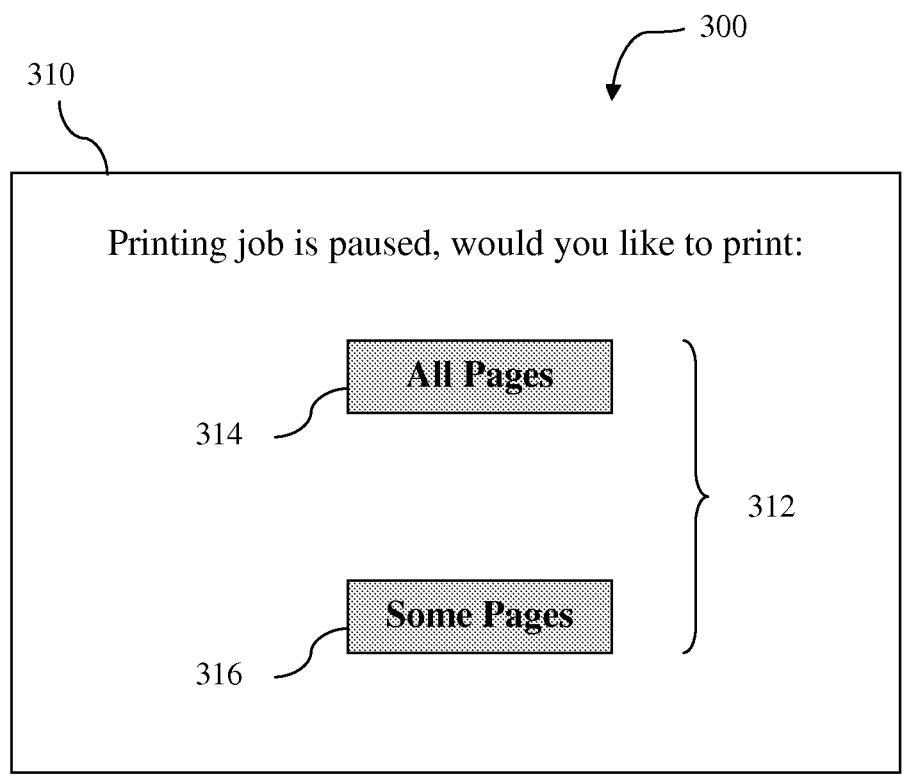
FIG. 7 illustrates an exemplary user interface (UI) of a printer control panel display for providing custom spool page printing according to an embodiment of the present invention.
Figure 8:
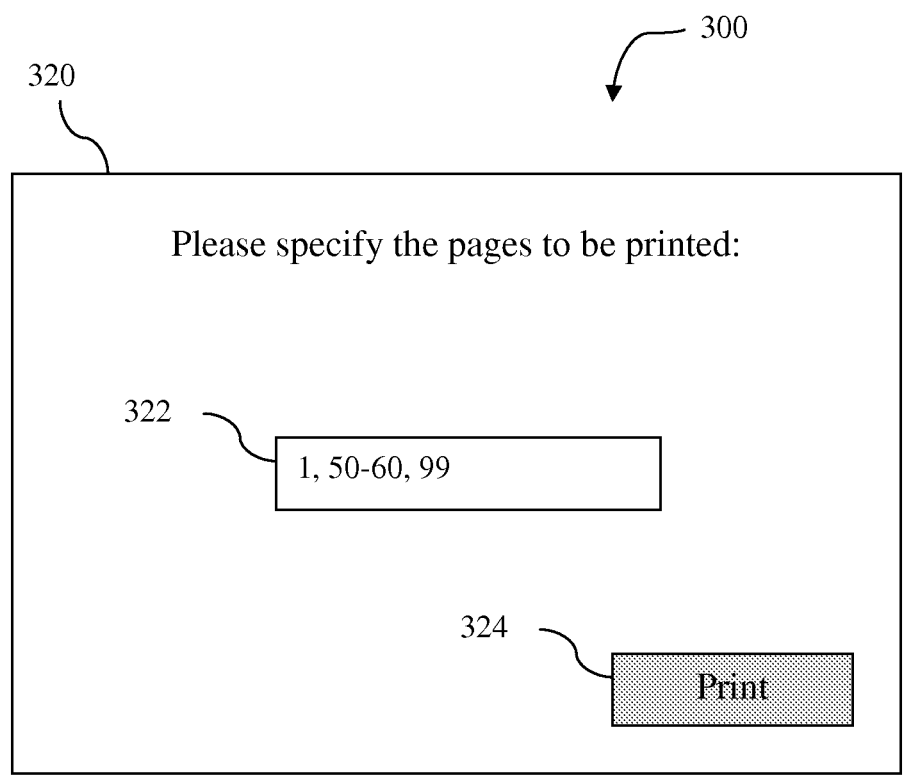
FIG. 8 illustrates another exemplary user interface (UI) of a printer control panel display for providing custom spool page printing according to an embodiment of the present invention.

Referring to FIGS. 7 and 8, there are illustrated exemplary UI provided on a display screen 300 of the printer display panel in accordance with the embodiment of the present invention method and program described above.

As shown in FIG. 7, the display screen 300 of the printer control panel may present a screen display 310 with a list of custom page printing options 312 (at step 280 as described in conjunction with FIG. 6 above. The user may either select to print all pages or only some pages. If the user selects to print all pages by selecting or pressing the "All Pages" button 314, then the printer engine will proceed to print all spooled pages (at step 282 as described in conjunction with FIG. 6 above). If the user selects to print only some pages by selecting or pressing the "Some Pages" button 316, then the display screen 300 of the printer control panel will next present a screen display 320 a shown in FIG. 8 with a dialog box 322 to allow the user to specify the particular page(s) to be printed (at step 290 as described in conjunction with FIG. 6 above). After the user inputs the desired page numbers to be printed, then user may press or select the "Print" button 324 whereupon the printer engine will proceed to print the selected pages (step 292 as described in conjunction with FIG. 6 above).

The term "screen display" is used herein to generally mean any suitable screen display that displays information to the user and/or allows the user to make a selection of functions or commands, or to input commands and other information, and is not limited to any specific form of display, and may include a series of consecutive displays.

Embodiments of the present invention also provide a printer for post-submission, post-rendering customer spooled page printing. Referring again to FIG. 5, the printer 102 has a non-transitory memory 116 for storing computer readable program code, a controller or control unit 110 coupled to the non-transitory memory 116 for executing the code to control the printer, where the code is configured to cause the printer 102 to execute a process for providing custom spooled page printing. The printer also has a control panel 140 coupled to the control unit 110 for providing a user interface (UI), and a print engine 130 controlled by the control unit 110.

The printer-based post-submission, post-rendering customer spooled page printing method and program reflecting some aspects and embodiments of the present invention method and printer have many advantages. The printer-based program provides a printer-based page control option to a user right at the printer after the user submits a raw print file directly to a printer and after the printer completely renders the file. It adds a desired page-control function to a direct print job without involving a printer driver or a print application. It saves precious time and resources by avoiding printing large number of unnecessary or unwanted pages.

Although examples of the various steps of the present invention method and program are shown and described in detail here (e.g. FIG. 6), the present invention is not limited to the specifics of the flowchart described herein. The present invention may be implemented using any suitable forms of computer software programs.

It will be apparent to those skilled in the art that various modification and variations can be made to the methods and programs of the present invention without departing from the spirit or scope of the invention. Thus, it is intended that the present invention cover modifications and variations that come within the scope of the appended claims and their equivalents.

What is claimed is:

1. A method for providing custom spooled page printing, comprising the steps of:
   a. sending a raw print file directly to a printer for direct printing;
   b. rendering the raw print file by the printer's interpreter;
   c. after all page(s) of the raw print file are spooled, pausing the printer's print engine;
   d. providing page printing options on the printer's control panel to allow a user to select page(s) to be printed;
   e. after receiving the user's page selection, starting the print engine to print only the page(s) selected by the user;
   f. after the raw print file is rendered, determining whether the raw print file has only one single page; and
   g. if it is determined that the print file has only one single page, then printing the single page without pausing the printer's print engine.

2. The method for providing custom spooled page printing according to claim 1, wherein the raw print file is sent to the printer via a LPR print command.

3. The method for providing custom spooled page printing according to claim 1, wherein the raw print file is sent to the printer via a raw print utility.

4. The method for providing custom spooled page printing according to claim 1, further comprising the step of, after the print engine is paused, providing a user interface (UI) on the printer's control panel for inquiring the user whether all pages of the raw print file need to be printed.

5. The method for providing custom spooled page printing according to claim 4, further comprising the step of, after receiving the user's confirmation of printing all pages, then printing all pages without providing further page printing options on the printer's control panel.

6. A printer, comprising:
   a non-transitory memory for storing computer readable program code;
   a control unit coupled to the non-transitory memory for executing the code to control the printer, the code being configured to cause the printer to execute a process for providing custom spooled page printing;

a control panel coupled to the control unit for providing a user interface (UI); and a print engine controlled by the control unit;

wherein the process comprises the steps of:

receiving a raw print file for direct printing;

rendering the raw print file by the printer's interpreter;

after all page(s) of the raw print file are spooled, pausing the printer's print engine;

providing page printing options on the printer's control panel to allow a user to select page(s) to be printed;

after receiving the user's page selection, starting the print engine to print only the page(s) selected by the user;

after the raw print file is rendered, determining whether the raw print file has only one single page; and if it is determined that the print file has only one single page, then printing the single page without pausing the printer's print engine.

7. The printer according to claim 6, wherein the printer receives the raw print file via a LPR print command.

8. The printer according to claim 6, wherein the printer receives the raw print file via a raw print utility.

9. a1) The printer according to claim 6, wherein the process further comprising the step of, after the print engine is paused, providing a user interface (UI) on the printer's control panel for inquiring the user whether all pages of the raw print file need to be printed.

10. The printer according to claim 9, wherein the process further comprising the step of, after receiving the user's confirmation of printing all pages, then printing all pages without providing further page printing options on the printer's control panel.

11. A method for providing custom spooled page printing, comprising the steps of:

a. sending a raw print file directly to a printer for direct printing;

b. determining whether the raw print file has only one single page;

c. if it is determined that the print file has only one single page, then printing the single page without pausing the printer;

d. if it is determined that the print file has more than one single page, then pausing the printer and providing page printing options to allow a user to select page(s) to be printed;

e. after receiving the user's page selection, starting to print only the page(s) selected by the user.

12. The method for providing custom spooled page printing according to claim 1, wherein the raw print file is sent to the printer via a LPR print command.

13. The method for providing custom spooled page printing according to claim 1, wherein the raw print file is sent to the printer via a raw print utility.

14. The method for providing custom spooled page printing according to claim 1, further comprising the step of, after the printer is paused, providing a user interface (UI) for inquiring the user whether all pages of the raw print file need to be printed.

15. The method for providing custom spooled page printing according to claim 14, further comprising the step of, after receiving the user's confirmation of printing all pages, then printing all pages without providing further page printing options.

16. A printer having a non-transitory memory for storing computer readable program code and a control unit coupled to the non-transitory memory for executing the code to control the printer, the code being configured to cause the printer to execute a process for providing custom spooled page printing, wherein the process comprises the steps of:

sending a raw print file directly to a printer for direct printing;

determining whether the raw print file has only one single page;

if it is determined that the print file has only one single page, then printing the single page without pausing the printer;

if it is determined that the print file has more than one single page, then pausing the printer and providing page printing options to allow a user to select page(s) to be printed;

after receiving the user's page selection, starting to print only the page(s) selected by the user.

17. The printer according to claim 16, wherein the printer receives the raw print file via a LPR print command.

18. The printer according to claim 16, wherein the printer receives the raw print file via a raw print utility.

19. The printer according to claim 16, wherein the process further comprises the step of, after the printer is paused, providing a user interface (UI) for inquiring the user whether all pages of the raw print file need to be printed.

20. The printer according to claim 19, wherein the process further comprises the step of, after receiving the user's confirmation of printing all pages, then printing all pages without providing further page printing options.

* * * * *